United States Patent
Kobayashi et al.

(10) Patent No.: US 10,122,812 B2
(45) Date of Patent: Nov. 6, 2018

(54) PUSH-TYPE INFORMATION TRANSMISSION DEVICE, PUSH-TYPE INFORMATION TRANSMISSION METHOD, AND PROGRAM

(71) Applicant: NEC Corporation, Toyko (JP)

(72) Inventors: Yukio Kobayashi, Tokyo (JP); Masahiro Kawato, Tokyo (JP); Hideaki Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 205 days.

(21) Appl. No.: 14/896,933

(22) PCT Filed: Jun. 25, 2014

(86) PCT No.: PCT/JP2014/066886
§ 371 (c)(1),
(2) Date: Dec. 9, 2015

(87) PCT Pub. No.: WO2014/208617
PCT Pub. Date: Dec. 31, 2014

(65) Prior Publication Data
US 2016/0182664 A1    Jun. 23, 2016

(30) Foreign Application Priority Data
Jun. 28, 2013 (JP) ................. 2013-136479

(51) Int. Cl.
*H04L 29/08* (2006.01)
*H04L 12/26* (2006.01)
*H04L 12/18* (2006.01)

(52) U.S. Cl.
CPC .......... *H04L 67/26* (2013.01); *H04L 12/1859* (2013.01); *H04L 12/1877* (2013.01); *H04L 43/0864* (2013.01); *H04L 67/06* (2013.01)

(58) Field of Classification Search
CPC . H04L 12/1859; H04L 43/0864; H04L 67/06; H04L 67/26; H04L 12/1877
(Continued)

(56) References Cited

U.S. PATENT DOCUMENTS

2007/0226057 A1    9/2007  Laruelle et al.
2008/0123545 A1 *  5/2008  Watanabe ............. H04L 43/026
                                              370/252
(Continued)

FOREIGN PATENT DOCUMENTS

CN    101674318 A    3/2010
CN    102307152 A    1/2012
(Continued)

OTHER PUBLICATIONS hinese Office Action dated Jun. 30, 2017; Application No. 201480036568.7.
(Continued)

*Primary Examiner* — Tu Nguyen
(74) *Attorney, Agent, or Firm* — Young & Thompson (57) ABSTRACT

A push-type information transmission device is provided with a determination unit that determines the number of clients at transmission destinations of push transmission information in each of a plurality of chronologically continuous periods on the basis of at least response delay distribution data which is a probability distribution indicating the ratio of responses to information to the time elapsed since transmission of the information, and allowable band data indicating the allowable amount of information transfer.

15 Claims, 7 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2010/0235452 A1* | 9/2010 | Fukasawa | ............... H04L 51/30 |
| | | | 709/206 |
| 2013/0166700 A1 | 6/2013 | Sudo et al. | |

FOREIGN PATENT DOCUMENTS

| | | |
|---|---|---|
| CN | 102594578 A | 7/2012 |
| CN | 102638849 A | 8/2012 |
| CN | 103095819 A | 5/2013 |
| CN | 103179520 A | 6/2013 |
| EP | 1853044 A1 | 11/2007 |
| JP | 2005-332133 | 12/2005 |
| JP | 2009-104332 | 5/2009 |
| JP | 2009-104378 | 5/2009 |
| JP | 2009-531739 | 9/2009 |
| JP | 2010161500 A | 7/2010 |
| JP | 2012-059056 | 3/2012 |

OTHER PUBLICATIONS

International Search Report, PCT/JP2014/066886, dated Sep. 16, 2014.
Chibana et al., "A Study on VoD Systems with Scheduled Push Delivery", ITE Technical Report, Dec. 13, 2007 (Dec. 13, 2007), vol. 31, No. 64, pp. 111 to 116.
Extended European Search Report (EESR) dated Feb. 3, 2017; Appln. No. 14817530.0.

\* cited by examiner

PUSH-TYPE INFORMATION TRANSMISSION DEVICE, PUSH-TYPE INFORMATION TRANSMISSION METHOD, AND PROGRAM

TECHNICAL FIELD

The present invention relates to a push-type information transmission device, a push-type information transmission method, and a program.

BACKGROUND ART

Push-type information transmission has recently been widely used where advertisements and the like are transmitted from server devices of business operators to mobile terminals owned by users. As means for push-type information transmission, SMS (Short Message Service) and push mail are commonly used. Advertisement transmission methods using push-type information transmission have a problem in which access concentration to a server occurs in response to messages that have been simultaneously distributed to a large number of mobile terminals, triggering a transitional congestion state in the network.

As means to avoid traffic concentration caused by such push-type information transmission, a method of lightening network loads by controlling data transmission bands can be considered. For example, PTL 1 describes a technique that, in a data transmission service, optimizes a network by consecutively accumulating network performance information of respective data transmission and reflecting the analysis result thereof to the next transmission policy.

CITATION LIST

Patent Literature

[PTL 1] Unexamined Japanese Patent Application Publication No. 2009-104378

SUMMARY OF INVENTION

Technical Problem

As another method, there has been generally used a method of controlling the number of push messages per unit time so that traffic of responses to push-type information transmission is distributed over time. However, the limit value of the number of push messages per unit time in such a control method has been determined empirically or through trial and error. A method of setting an optimal limit value in consideration of a network state has not been found. As such, a method of merely dispersing push-type information transmission cannot efficiently utilize a network band while it can avoid the congestion state of the network. This results in prolonging the network saturation state.

The concentration and duration of the transitional congestion state caused by push messages are known to be largely dependent on the distribution of response time of clients who have received the push messages and respond to the messages. The above-described transmission method which does not take in account such a circumstance could hardly lighten the concentration and prolonged duration of the transitional congestion state.

An example of the objective of this invention is to provide an information transmission device, an information transmission method and a program that can solve the above problem.

Solution to Problem

The push-type information transmission device according to an aspect of the present invention includes a determination unit that determines the number of transmission destination clients of push transmission information in each of a plurality of chronologically continuous periods on the basis of at least response delay distribution data that is a probability distribution indicating the ratio of responses to information in relation to the time elapsed since transmission of the information and allowable band data indicating the allowable amount of information transfer.

The push-type information transmission method according to an aspect of the present invention includes determining the number of transmission destination clients of push transmission information in each of a plurality of chronologically continuous periods on the basis of at least response delay distribution data that is a probability distribution indicating the ratio of responses to information in relation to the time elapsed since transmission of the information and allowable band data indicating the allowable amount of information transfer.

The program according to an aspect of the present invention causes a computer to execute determining the number of transmission destination clients of push transmission information in each of a plurality of chronologically continuous periods on the basis of at least response delay distribution data that is a probability distribution indicating the ratio of responses to information in relation to the time elapsed since transmission of the information and allowable band data indicating the allowable amount of information transfer.

Advantageous Effect of Invention

The present invention enables optimization of network band utilization in push-type information transmission.

DESCRIPTION OF EMBODIMENTS

The following will describe a push-type information transmission device according to the exemplary embodiments of the present invention with reference to FIGS. 1-7.

Figure 1:
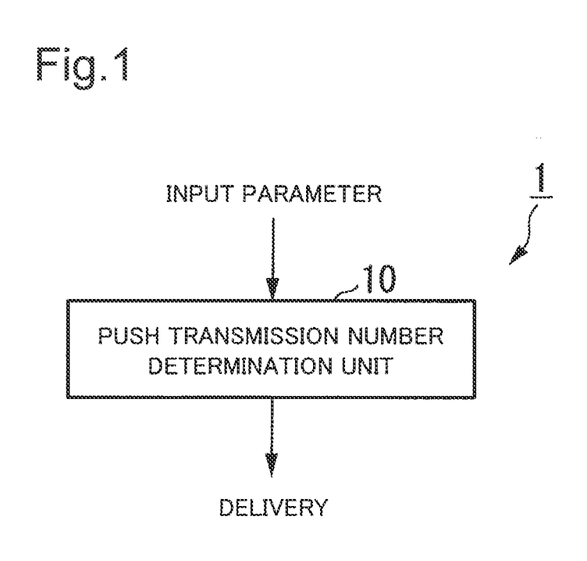
FIG. 1 is a diagram illustrating a configuration of a push-type information transmission device according to an exemplary embodiment of the present invention.

FIG. 1 is a diagram illustrating a configuration of a push-type information transmission device (which may be, hereinafter, referred to as a transmission device) 1 according to an exemplary embodiment.

As illustrated in FIG. 1, the transmission device 1 includes at least a push transmission number determination unit (which may be, hereinafter, referred to as a determination unit) 10.

The determination unit 10 has a function of accepting input, such as client response delay distribution data and allowable band variation data, and performing a calculation of a transmission method in push-type information transmission so as to optimize a network band. The exemplary embodiment attempts to optimize a network band that is led by push-type information transmission by chronologically dispersing timing of push-type information transmission and adjusting the number of clients as transmission targets in each of a plurality of chronological time intervals (periods). The determination unit 10 determines the number of transmission destination clients in each time interval using the received client response delay distribution data, allowable band variation data, and the like (hereinafter, the distribution of the number of transmission destination clients over time will be referred to as optimal time shift model data).

Here, push-type information transmission means active transmission of information, such as advertisements, from a server device to client terminal devices. The client response delay distribution data is probability distribution data that indicates the ratio of client responses to the total number of transmission destination clients in relation to elapsed time. The client response delay distribution data may be an assumption value that has been set for a traffic model or a statistical estimate value based on the response history of the transmission destination clients to push-type information transmission. The allowable band variation data (allowable band data) is data that indicates an allowable variation in the amount of information transfer per unit time in a communication network that is connected to the device in relation to time elapsed after push-type information transmission. The allowable band variation data may be an assumption value that has been set in designing the network or an extrapolation value based on consecutive traffic amount measurement.

The determination unit 10 is configured by the CPU (Central Processing Unit) of a server terminal or the like executing a program.

First Exemplary Embodiment

Figure 2:
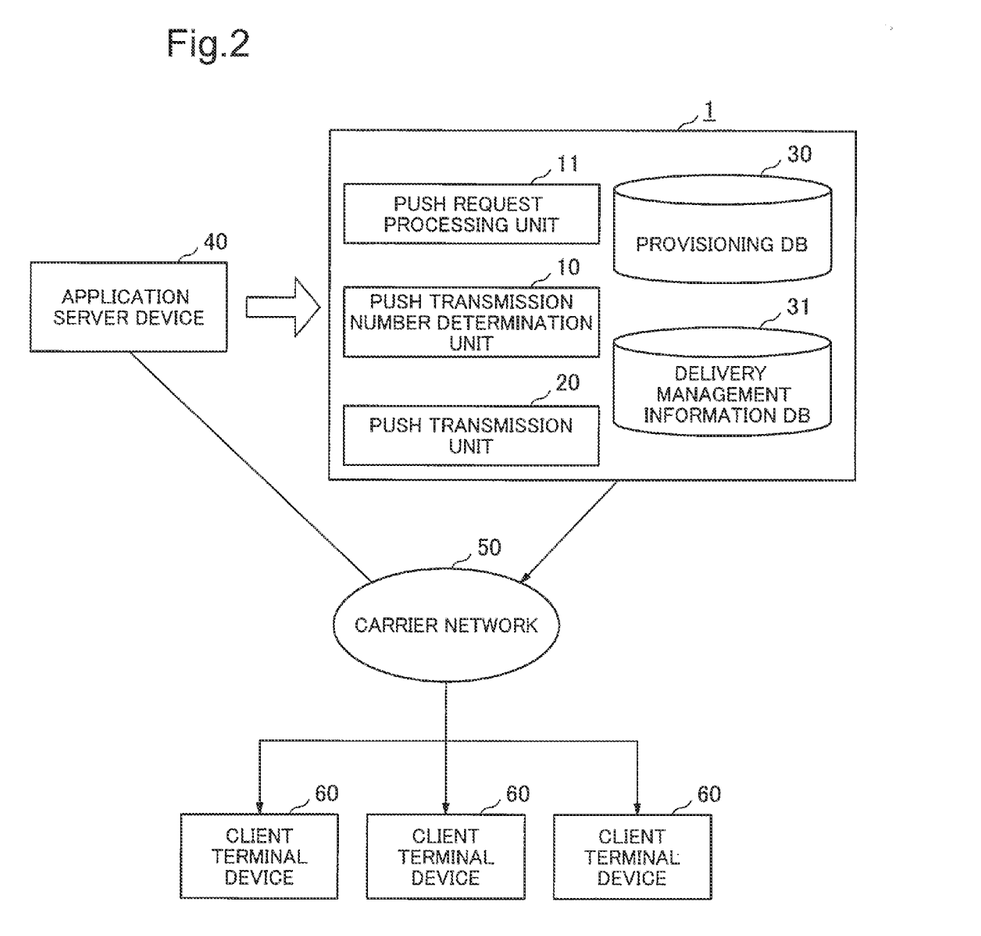
FIG. 2 is a diagram illustrating a configuration of a push-type information transmission device according to a first exemplary embodiment of the present invention.

FIG. 2 is a diagram illustrating a configuration of a transmission device 1 according to a first exemplary embodiment. In FIG. 2, the same functional units as those of FIG. 1 will be described with the same reference signs appended thereto.

As illustrated in FIG. 2, the transmission device 1 includes a determination unit 10, a push request processing unit 11, a push transmission unit 20, a provisioning database (DB) 30, and a transmission management information database (DB) 31. The push request processing unit 11 may also be referred to as a processing unit 11 in the following description. The push transmission unit 20 may also be referred to as a transmission unit 20 in the following description. The transmission device 1 is connected to an application server device 40 and client terminal devices 60 through a carrier network 50.

The client terminal device 60 may be a mobile terminal, such as a smartphone, or a PC terminal used by a user. The client terminal device 60 is connected to the transmission device 1 and the application server device 40 through a network. The client terminal device 60 owned by a user receives push transmission information transmitted by the transmission device 1.

Having received the push transmission information, the client terminal device 60 accesses the application server device 40 based on information, such as URL, included in the push transmission information and performs file download and the like.

A specific example of the carrier network 50 may be a Long Term Evolution (LTE) network or a 3G network. In the first exemplary embodiment, a network environment that uses a carrier network that is susceptible to band restrictions is assumed. However, there is no restriction on the kind of network, whether it is a carrier network or a public network, in the present invention.

The application server device 40 is a server device, on which is running an application and the like that is necessary for provision of a service to be used by a user with a client terminal device 60. The application server device 40 has a function of not only providing an application service but also requesting the transmission device 1 for performing push-type information transmission, to the client terminal devices 60, of a guidance of the application service to be provided to a user.

The processing unit 11 has a function of receiving a request of push-type information transmission from the application server device 40. A specific example of the received information includes information, such as the details of a transmission message and a group to which the transmission destination client belongs, information indicating the data size of a content to be provided to the client and a transmission bit rate, and transmission start time and date. The processing unit 11 checks the received information and requests the determination unit 10 for calculation of optimal time shift model data. The processing unit 11 is configured by the CPU of a server terminal or the like executing a program.

The provisioning DB 30 is a database that retains the information of client response delay distribution data and allowable band variation data. The information of client response delay distribution data and allowable band variation data is stored in advance in the provisioning DB 30. The client response delay distribution data and allowable band variation data will be described later herein with specific examples. Further, the provisioning DB 30 stores optimal time shift model data that was calculated by the determination unit 10.

The transmission management information DB 31 is a database that retains information relating to an application program to be provided to a user and information relating to a client who is a transmission destination of push transmission information. The processing unit 11 receives such information from the application server device 40 and stores the information in the transmission management information DB 31. A specific example of information relating to the application program may include a content data size and the start time of push-type information transmission. The information relating to a client may be information that is necessary for specifying a transmission destination, such as the terminal ID and terminal IP address of a client terminal device 60.

The transmission unit 20 is configured, for example, to perform push-type information transmission, based on the optimal time shift model data that was calculated by the determination unit 10, to the client terminal device 60 of the transmission destination that is stored in advance in a table format by the transmission device 1. Representative push transmission information includes text messages including push notification of SMS and MDM (Mobile Device Management) and a URL (Uniform Resource Locator) of a content site. A specific example of push transmission information may include information transmission through a packet, a call, and a mail. Among such messages, the first exemplary embodiment particularly deals with a kind of information where the same information is broadcast to many clients to induce responses from users. In the following description, a message that is transmitted by push-type information transmission is referred to as push transmission information.

The determination unit 10 and the transmission unit 20 may be implemented in different devices where the transmission unit 20 receives output from the determination unit 10 via a line between the devices or network means.

The transmission unit 20 is configured by the CPU (Central Processing Unit) of a server terminal or the like executing a program.

Figure 3:
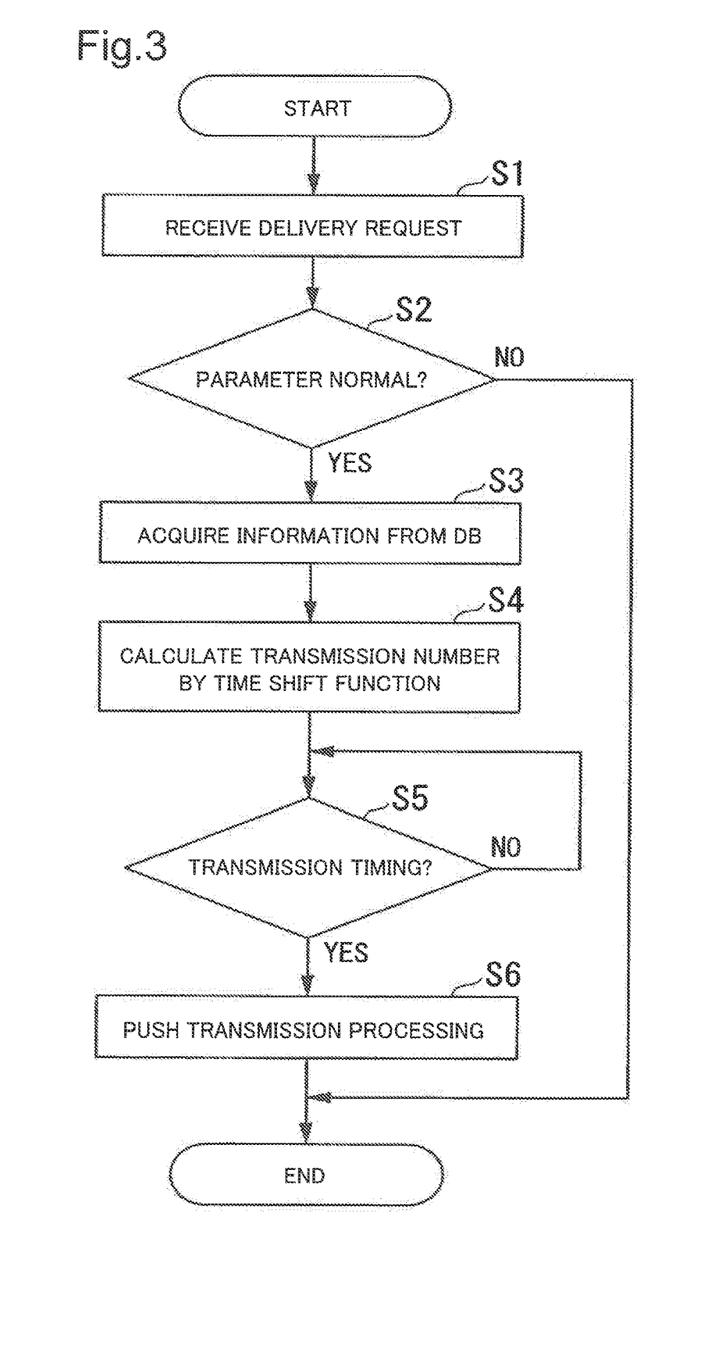
FIG. 3 is a diagram illustrating a processing flow of the push-type information transmission device according to the first exemplary embodiment of the present invention.

FIG. 3 is a diagram illustrating a processing flow of the transmission device 1 according to the first exemplary embodiment.

With reference to the processing flow of FIG. 3, the processing where the transmission device 1 performs push-type information transmission will the described.

First, the processing unit 11 receives a request of push transmission from the application server device 40 (step S1).

Next, the processing unit 11 checks the parameter value received from the application server device 40 (step S2). The checking of the parameter value checks whether the application program that requested transmission is appropriate, whether the number of transmission destination clients is within a contracted scope, whether a group or the like to which the transmission destination client belongs is appropriate, and the like. If there is abnormality in checking of the parameters, the processing unit 11 returns "reject" to the application server device 40 and terminates this processing flow.

If the parameter check ends normally, the determination unit 10 retrieves information of appropriate client response delay distribution data and allowable band variation data from the provisioning DB using, for example, the kind of the application program and transmission destination user information. Further, the determination unit 10 retrieves the total number of transmission destination clients and a content data size from the transmission management information DB 31 (step S3).

Next, the determination unit 10 calculates at which timing to perform push-type information transmission to what number of transmission destination clients based on the information retrieved at step S3, and stores optimal time shift model data as the calculation result in the provisioning DB 30 (step S4).

The processing of steps S1 to S4 is preparation for push-type information transmission.

Next, the transmission unit 20 retrieves start time of push-type information transmission from the transmission management information DB 31 and determines whether to start transmission (step S5). If the present time is not transmission start time, the transmission unit 20 waits until the transmission start time. If the present time is transmission start time, the transmission unit 20 retrieves optimal time shift model data from the provisioning DB 30, as well as, retrieves transmission destination address information from the transmission management DB 31. Then, the transmission unit 20 starts push-type information transmission based on this information (step S6).

When the push transmission information has finished being transmitted to all the clients who belong to the transmission destination group, the processing flow of FIG. 3 ends.

Figure 4A:
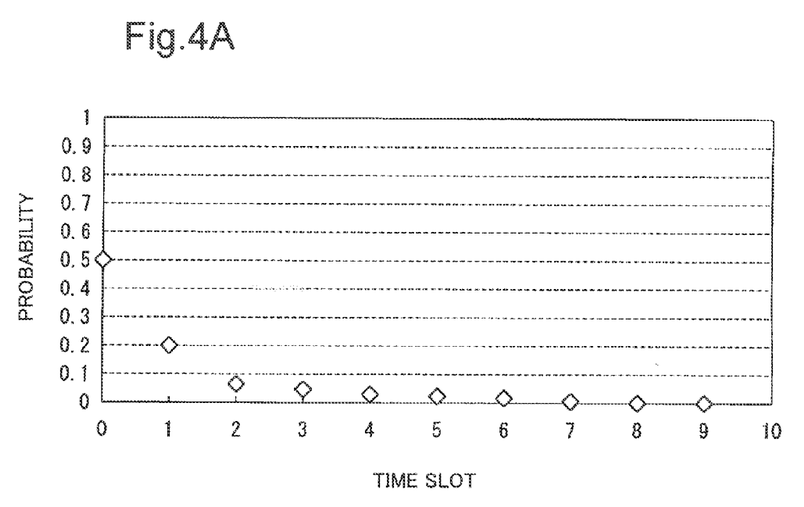
FIG. 4A is a diagram illustrating an example of client response delay distribution data according to the first exemplary embodiment of the present invention.
Figure 4B:
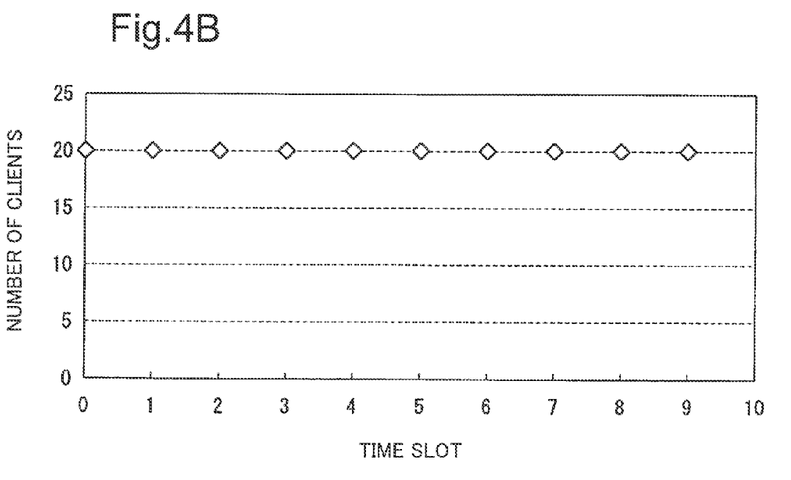
FIG. 4B is a diagram illustrating an example of allowable band variation data according to the first exemplary embodiment of the present invention.

FIGS. 4A and 4B are diagrams illustrating an example of client response delay distribution data and allowable band variation data according to the first exemplary embodiment.

With reference to FIGS. 4A and 4B, the client response delay distribution data and allowable band variation data of the transmission device 1 will be described.

The graph of FIG. 4A is an example of client response delay distribution data. This graph is predictive model data based on the past statistics and the like illustrating at which timing and how many clients respond to push-type information transmission after the transmission device 1 performing the push-type information transmission. The vertical axis of FIG. 4A indicates the ratio of responding clients with reference to the total number of transmission destination clients. The horizontal axis of FIG. 4A indicates time elapsed after performing push-type information transmission. The time slot unit time indicated on the horizontal axis of the graph of FIG. 4A is conceptual unit time for measuring the elapsed time. As will be described later, the transmission device 1 transmits information in time slot unit time after starting the push-type information transmission. The client response delay distribution data retains the response ratio of clients for each time slot unit time. In FIG. 4A, the response ratio in "time slot=0" is 0.5. Here, as a specific example, a time slot is defined as one second. In such a case, the client response delay distribution data indicates that 50% of the clients will respond during one second since starting of the push-type information transmission. In FIG. 4A, the response ratio in "time slot=1" is 0.2. Therefore, the client response delay distribution data indicates that 20% of the clients will respond during one second after one second since starting the push-type information transmission, that is, during one to two seconds since starting the transmission.

Next, the graph of FIG. 4B will be described. The graph of FIG. 4B is an example of allowable band variation data. This graph is a graph illustrating, for each time slot time, how much band occupation by responses from clients is allowed after starting push-type information transmission. In FIG. 4B, the allowable band is indicated by the number of responding clients. In FIG. 4B, for example, the number of clients in "time slot=0" is twenty units. This means that the number of clients who respond since the start of push-type information transmission until one second has elapsed is allowed up to twenty units, and that the allowable network band is exceeded if twenty or more clients respond within the duration. In the case of FIG. 4B, the allowable band is always stable.

The allowable band indicated by the maximum value of the number of clients in the allowable band variation data is the maximum value of the allowable band for clients' responses and not the maximum value of the allowable band in the network. The maximum allowable band for each time interval in the allowable band variation data can be calculated, for example, by subtracting the band to be used for other communications from the network band. The units of the vertical axis in the allowable band variation data may be commonly used bps. There is no restriction for the length of the time slot. As a specific example, the length of the time slot may be certain seconds (for example, during one to sixty seconds).

Figure 5A:
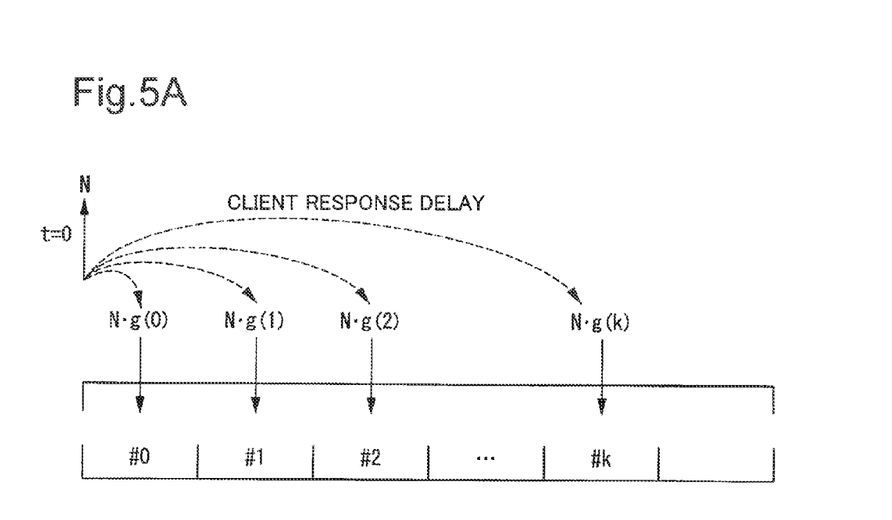
FIG. 5A is a diagram illustrating an example of push-type information transmission according to the first exemplary embodiment of the present invention.
Figure 5B:
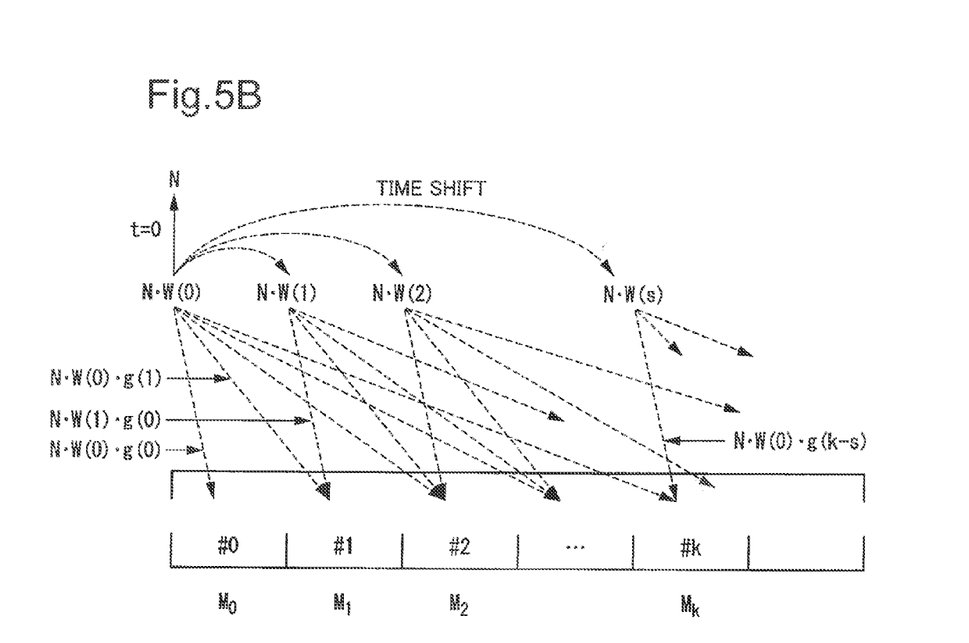
FIG. 5B is a diagram illustrating an example of push-type information transmission according to the first exemplary embodiment of the present invention.

FIGS. 5A and 5B are diagrams illustrating an example of push-type information transmission according to the first exemplary embodiment.

With reference to FIGS. 5A and 5B, a method of time shifting the push-type information transmission will be described.

FIG. 5A is a diagram illustrating how clients of a transmission destination group who received the push transmission information respond in "time t=0" by sectioning per time slot (#0, #1, . . . , #k). Here, the total number of clients of a transmission destination group is represented by "N". Further, the response ratio in "time slot=k (that is, time slot #k)" is represented by "g(k)". In this case, the number of clients who respond during "time slot=k" is "N×g(k)".

If all clients are assumed to respond, the following equation (1) is established.

[Math. 1]

$$\sum_{k=0}^{\infty} g(k) = 1 \qquad (1)$$

FIG. 5B is a diagram illustrating how clients respond when push-type information transmission is performed with time shifting by sectioning per time slot. Time shift, in the first exemplary embodiment, means dispersing of transmission timing into a plurality of time slots. Here, the ratio of the number of clients to whom the information is transmitted in "time slot=s" in relation to the total number of transmission destination clients is represented by "W(s)". Further, the allowable band in "time slot=s" is represented by M(s). In such a case, for example, the number of transmission destination clients in "time slot=0" is "N×W(0)". The number of the responding clients in relation to transmission in "time slot=0" is "N×W(0)×g(0)" in "time slot=0" and "N×W(0)×g(1)" in "time slot=1".

The following equation (2) is established for the ratio W of the number of clients to whom the information is transmitted in each time slot in relation to the total number of the transmission destination clients.

[Math. 2]

$$\sum_{s=0}^{\infty} W(s) = 1 \qquad (2)$$

Next, each time slot is focused. As illustrated in FIG. 5B, for example, the number of clients who respond during the section of "time slot=0" (time slot #0) is "N×W(0)×g(0)". The number of clients who respond during the section of "time slot=1" (time slot #1) is "N×W(0)×g(1)+N×W(1)×g(0)".

Here, it is assumed that the number of responses from clients in "time slot=k" is most preferably equal to the allowable band in "time slot=k" as the maximum value of the number of responses. In such a case, in a most preferable circumstance, the following equation (3) is established, for example, with "time slot=0".

$$N \times W(0) \times g(0) = M(0) \qquad (3)$$

Further, in a most preferable circumstance, the following equation (4) is established, for example, with "time slot=1".

$$N \times W(0) \times g(1) + N \times W(1) \times g(0) = M(1) \qquad (4)$$

Suppose the time shift amount of transmission timing is s slot and clients respond with delay of only j slot from transmission in s slot. In such a case, generally, the following equation (5) is established with "slot=k" where "s+j=k" is satisfied.

[Math. 3]

$$\sum_{s+j=k} N \times W(s) \times g(j) = M(k) \qquad (3)$$

In equations (3) to (5), for example, an influence of a case where transferring of content data to clients who responded in "time slot=0" has not completed within "time slot=0" and continues thereafter will not be considered.

Next, with examples of the above-described "time slot=0, 1," this equation is solved by assigning concrete numerical values.

Specific Example 1

In a Case of "Time Slot=0"

By modifying the above equation (3), the following equation (6) can be obtained.

$$W(0) = M(0)/(N \times g(0)) \qquad (6)$$

Here, values indicated by the graphs of FIGS. 4A and 4B are referred to. From FIG. 4A "g(0)=0.5". From FIG. 4B, "M(0)=20". The value of "N" is assumed as "100". By substituting these values into equation (6) as follows, the value of "W(0)" is calculated.

$$W(0) = 20/(100 \times 0.5) = 0.4$$

As described above, the number of transmission destinations in "time slot=0" can be derived as follows.

$$N \times W(0) = 100 \times 0.4 = 40 \text{(clients)}$$

Specific Example 2

In a Case of "Time Slot=1"

By modifying the above equation (4), the following equation (7) can be obtained.

$$W(1) = (M(1) - N \times W(0) \times g(1))/(N \times g(0)) \qquad (7)$$

As the result of "time slot=0," "W(0)=0.4" can be obtained. From FIG. 4A, "g(1)=0.2". From FIG. 4B, "M(1)=20". By substituting these values into the equation (7), the value of W(1) is calculated.

$$W(1) = (20 - 100 \times 0.4 \times 0.2)/(100 \times 0.5) = 0.24$$

As described above, the number of transmission destinations in "time slot=1" can be derived as follows.

$N \times W(1) = 100 \times 0.24 = 24 \text{(clients)}$

The processing of the above specific example 2 can be expressed as follows.

"Time slot=1" (second period) is continuous from "time slot=0" (first period) and after "time slot=0". The determination unit specifies the response ratio (g(1)) in "time slot=1" in relation to the transmission in "time slot=0" from the response delay distribution data of FIG. 4A. The determination unit 10 calculates the amount of information transfer (N×W(0)×g(1)) based on the number of transmission destination clients (N×W(0)) and the respond ratio (g(1)) in "time slot=0". The determination unit 10 specifies the response ratio (g(0)) in "time slot=1" in relation to the transmission in "time slot=1" from the response delay distribution data of FIG. 4A. The determination unit 10 specifies the amount of information transfer (M(1)) that can be allowed in "time slot=1" from the allowable band variation data (allowable band data) of FIG. 4B. The determination unit 10 determines the number of transmission destination clients (N×W(1)) in "time slot=1" at least based on the amount of information transfer (N×W(0)×g(1)), response ratio (g(0)), and allowable amount of information transfer (M(1)).

That is, the ratio W(k) of the number of transmission destination clients in one time interval (time slot=k) in relation to the total number of transmission destination clients is calculated by the following processing. First, among clients' responses to push transmission information that was transmitted in one time interval and previous time interval (time slot=0 to k−1), the amount of information transfer of responses in "time slot=k" is calculated based on client response delay distribution data. Then, the ratio W(k) can be obtained by solving an equation that expresses that the value calculated as a sum thereof equals the allowable band in "time slot=k". As described in the above example, the solution for this equation with "time slot=k" can be calculated by reflecting the calculation results that were obtained by sequentially calculating from "time slot=0" to "time slot=k−1".

Figure 6:
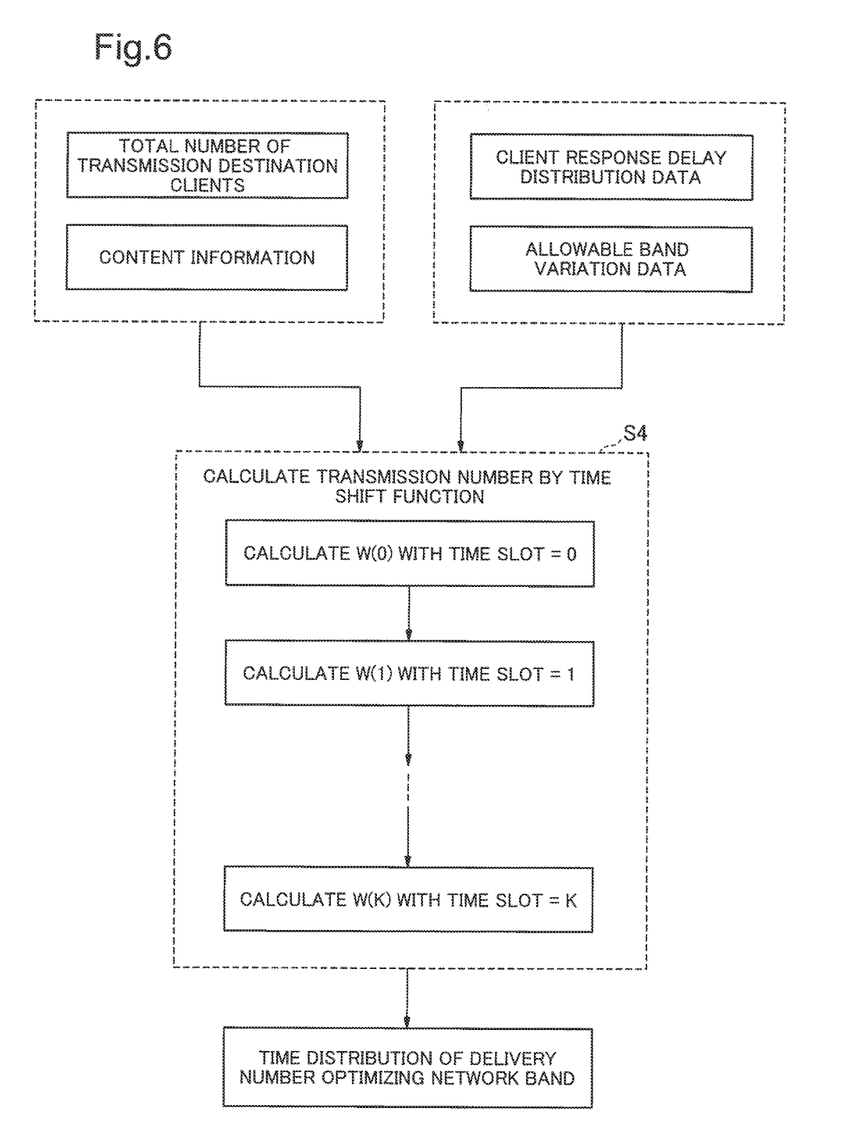
FIG. 6 is a diagram illustrating processing of a push transmission number determination unit of the push-type information transmission device according to the first exemplary embodiment of the present invention.

FIG. 6 is a diagram illustrating processing in the determination unit 10 of the transmission device 1 according to the first exemplary embodiment.

With reference to FIG. 6, the processing in the determination unit 10 of the transmission device 1 will be described.

The determination unit 10 accepts input of the total number of transmission destination clients of push transmission information, content information, client response delay distribution data, and allowable band variation data. The content information is information, such as the file size of a content and data transfer speed that is instructed by an application. The client response delay distribution data and allowable band variation data is as has been described with reference to FIGS. 4A and 4B.

The content information is information that is used for calculating the number of allowable response clients indicated by the vertical axis of FIG. 4B indicating allowable band variation data. As a specific example, a case where the units of the vertical axis of the allowable band variation data are given as common bps will be described. In such a case, the number of allowable response clients can be obtained by dividing the given allowable band by data transfer speed included in the content information. Further, when the transfer of content data to clients who responded in "time slot=0" do not complete within "time slot=0" and continues thereafter, the content size and the data transfer speed are used to calculate the band occupied by the data being transferred.

The determination unit 10 gives these input values to a time shift function at the above-described step S4 and calculates a time distribution of the number of transmission destinations that optimizes the network band. The calculation method by a time shift function is as has been described with reference to FIGS. 5A and 5B. First, the ratio W(0) of the insertable number of transmission destination clients in time slot=0 is calculated and, then, W(1) is calculated. By reiterating such processing, the number of insertable transmission destination clients in time slot=k is sequentially calculated. Then, the determination unit 10 ends the calculation when the sum of "W(0)+W(1)+ . . . " reaches 1. In consideration of a case where there are clients who do not respond, the calculation may be determined to end when the sum of "W(0)+W(1)+ . . . " reaches a predetermined value of less than 1 (for example, 0.9).

According to the first exemplary embodiment, the traffic amount caused by the push-type information transmission can be contained within the allowable network band, as well as, the average delay time can be minimized. Here, the average delay time refers to time of delay of the latest transmission time in relation to the earliest transmission time when push-type information transmission is performed with time shifting.

Figure 7:
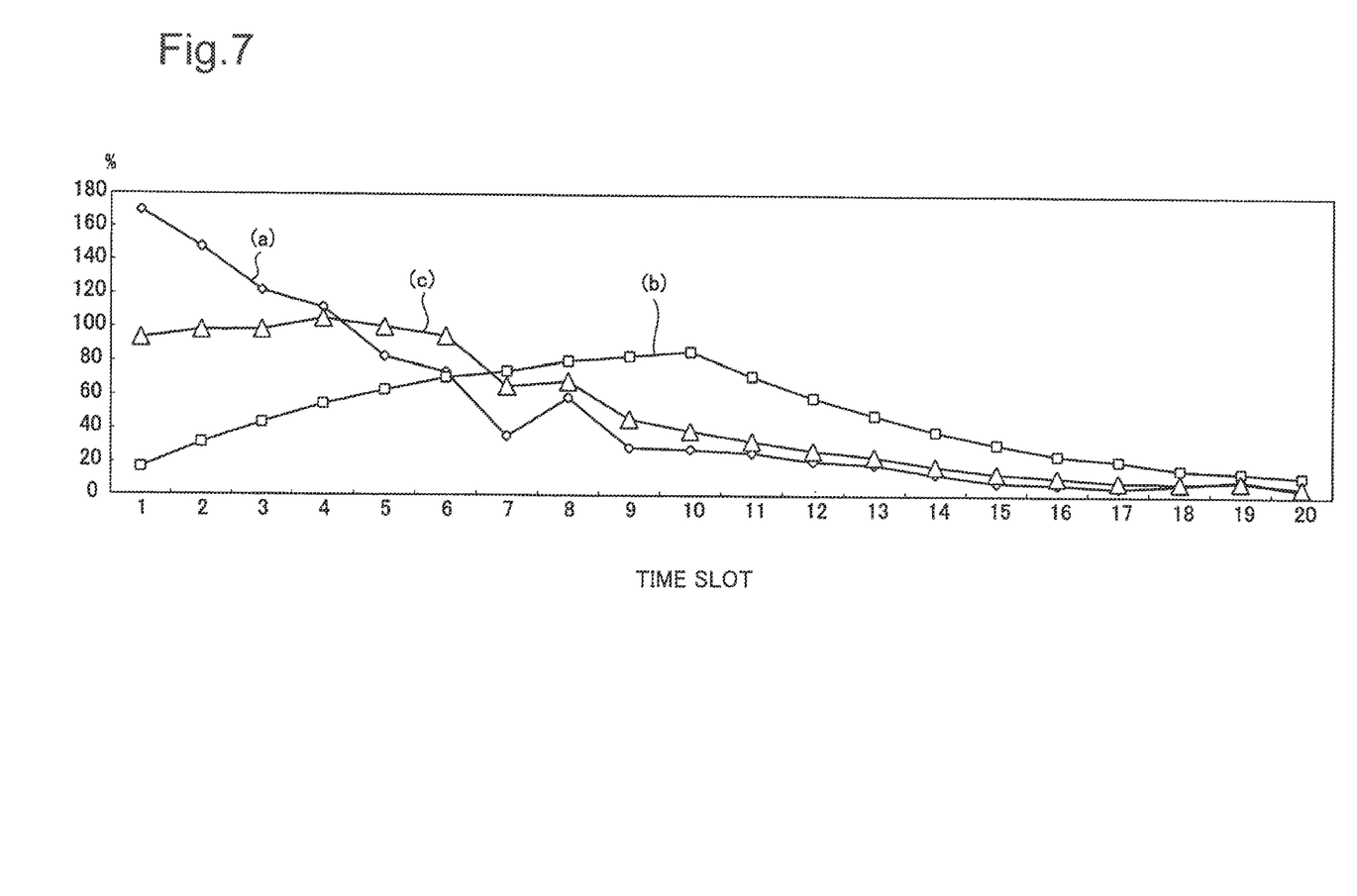
FIG. 7 is a diagram illustrating an effect of the push-type information transmission device according to the first exemplary embodiment of the present invention.

FIG. 7 is a diagram illustrating an effect of the transmission device 1 according to the first exemplary embodiment.

With reference to FIG. 7, the diagram illustrating the effect of the transmission device 1 will be described.

The vertical axis of FIG. 7 indicates the ratio of the amount of information transfer by responses of clients occupying the allowable network band. The horizontal axis indicates time slots.

The line (a) of FIG. 7 indicates a congestion state of the network after simultaneous transmission of push-type information transmission to all the clients without time shifting. The line (b) of FIG. 7 indicates a congestion state of the network after transmission of push-type information transmission to the clients with time shifting by a simple method, such as, transmitting to a certain number of clients once every five minutes. The line (c) of FIG. 7 indicates a congestion state of the network after transmission of push-type information transmission with time shifting according to the first exemplary embodiment of the present invention.

The line (a) of FIG. 7 indicates that the congestion state during the period "time slot=2 to 6" exceeds 100%. This indicates that, when push-type information transmission is performed without time shifting, congestion occurs in the network due to responses to the transmission during the period, which might make the service unavailable for users and might possibly adversely affect other services. Further, retrying by users who cannot use the service may possibly cause further congestion of the network. The line (b) of FIG. 7 indicates that the traffic falls below 50% during the period of "time slot=1 to 3" and that the period where the traffic exceeds 50% continues during as long as "time slot=4 to 12". This indicates that push-type information transmission with simple time shifting cannot effectively utilize the network band immediately after starting push transmission, thereby prolonging the state where the transmission occupies more than half of the network band. In contrast, the line (c) of FIG. 7 indicates that, according to the push-type information transmission of the first exemplary embodiment of the present invention, the period during which more than half of the network band is occupied can be shortened while avoiding the congestion state of the network. As such, a communications carrier or the like can suppress prolonging of the excessive load state of the network caused by push-type information transmission. Further, users can attain the effect of being able to avoid a service unavailable state and a decrease in downloading speed.

The components of the above-described exemplary embodiment can be replaced with known components as necessary without departing from the spirit of the present invention. Further, the technical scope of the present invention is not limited to the above exemplary embodiment and can be modified in a variety of ways without departing from the spirit of the present invention.

For example, as an exemplary embodiment, the transmission management information DB 31 may retain information relating to priority in terms of transmission orders for respective client terminal devices 60, and the transmission unit 20 may perform push-type information transmission by assigning earlier time slots to clients with higher priority. Further, as an exemplary embodiment, in order to solve inequality in the order of arrival time of push transmission information for respective client terminal devices 60, the transmission management DB 31 may retain, for each push-type transmission, information of which number of time slot the transmission is performed for in relation to each client terminal device 60, and the order of transmission timing can be adjusted in consideration of the past transmission performance. As a specific example, current transmission may be performed in the latest time slot for clients to whom the previous transmission was made in the earliest time slot, while current transmission may be performed in the second from the latest time slot for clients to whom the previous transmission was made in the last time slot.

As an exemplary embodiment, the determination unit 10 may calculate optimal time shift model data using client response delay distribution data and allowable band variation data of a variety of patterns, and users or algorithm may select most appropriate optimal time shift model data therefrom. For example, if somewhat delay time can be allowed without a need of minimizing average delay time, the application server device 40 can designate time until completion of push-type information transmission (average delay time) and calculate time shift model data such that the push-type information transmission ends around time closest to the designated time. In such a case, the determination unit 10 may perform a simulation using a plurality of kinds of allowable band variation data or by changing the time shift intervals.

The above-described transmission device 1 has a computer thereinside. The process of each processing of the transmission device 1 is stored in a computer-readable storage medium in the form of a program and the processing is performed by the computer reading and executing this program. Here, the computer-readable storage medium includes a magnetic disk, a magneto optical disc, a CD-ROM, a DVD-ROM, and a semiconductor memory. Further, this computer program may be transmitted to a computer by a communication line and the computer that received this transmission may execute the program.

The program may realize only part of the above-described features.

The program may be the one that can realize the above-described features in combination with a program that is already stored in a computer system, that is, a difference file (a difference program).

This application claims priority based on Japanese Patent Application No. 2013-136479 filed on Jun. 28, 2013, which application is incorporated herein in its entirety by disclosure.

INDUSTRIAL APPLICABILITY

The present invention can be applied to a push-type information transmission device, a push-type information transmission method, and a program.

REFERENCE SIGNS LIST

1 Push-type information transmission device (transmission device)
10 Push transmission number determination unit (determination unit)
11 Push request processing unit (processing unit)
20 Push transmission unit (transmission unit)
30 Provisioning DB
31 Transmission management information DB
40 Application server device
50 Carrier network
60 Client terminal device

The invention claimed is:

1. A push-type information transmission device comprising:
   a determination unit
      that determines a number of transmission destination clients of push transmission information in each of a plurality of chronologically continuous periods based on at least response delay distribution data that is a probability distribution indicating a ratio of responses to information in relation to time elapsed since transmission of the information and allowable band data indicating allowable amount of information transfer; and
   a transmission unit that transmits a push-type information based on the number of clients determined by the determination unit,
   wherein the response delay distribution data is a probability distribution indicating a response ratio of clients in relation to time elapsed since transmission of push transmission information that induces responses from the clients as transmission targets to the clients, and
   the allowable band data indicates variation in the amount of information transfer per unit time that is allowable in relation to time elapsed of a communication network that is connected to the push-type information transmission device.

2. The push-type information transmission device according to claim 1,
   wherein the plurality of periods include a first period and a second period that is continuous from the first period and after the first period;
   the determination unit specifies a first response ratio during the second period in response to transmission during the first period from the response delay distribution data;
   the determination unit calculates an amount of information transfer based on the number of transmission destination clients during the first period and the first response ratio;
   the determination unit specifies a second response ratio during the second period in response to transmission during the second period from the response delay distribution data;

the determination unit specifies the allowable amount of information transfer during the second period from the allowable band data; and the determination unit determines the number of transmission destination clients during the second period at least based on the calculated amount of information transfer, the second response ratio, and the calculated amount of information transfer.

3. The push-type information transmission device according to claim 2, wherein the determination unit simulates the number of transmission destination clients using a combination of one of a plurality of kinds of the response delay distribution data and one of a plurality of kinds of the allowable band variation data.

4. The push-type information transmission device according to claim 1, wherein the push transmission unit determines priority based on information indicating a priority regarding order of transmission of the push transmission information to the transmission destination clients or a past transmission performance, and the push transmission unit transmits the push-type information based on the priority.

5. The push-type information transmission device according to claim 4, wherein the determination unit simulates the number of transmission destination clients using a combination of one of a plurality of kinds of the response delay distribution data and one of a plurality of kinds of the allowable band variation data.

6. The push-type information transmission device according to claim 1, wherein the determination unit simulates the number of transmission destination clients using a combination of one of a plurality of kinds of the response delay distribution data and one of a plurality of kinds of the allowable band variation data.

7. The push-type information transmission device according to claim 6, wherein the determination unit determines the number of transmission destination clients such that push-type information transmission completes within closest time to average delay time that is time from starting to finishing the push-type information transmission.

8. The push-type information transmission device according to claim 1, wherein the determination unit outputs the number of transmission destination clients.

9. The push-type information transmission device according to claim 1, wherein the plurality of periods include a first period and a second period that is continuous from the first period and after the first period;

the determination unit specifies a first response ratio during the second period in response to transmission during the first period from the response delay distribution data;

the determination unit calculates an amount of information transfer based on the number of transmission destination clients during the first period and the first response ratio;

the determination unit specifies a second response ratio during the second period in response to transmission during the second period from the response delay distribution data;

the determination unit specifies the allowable amount of information transfer during the second period from the allowable band data; and the determination unit determines the number of transmission destination clients during the second period at least based on the calculated amount of information transfer, the second response ratio, and the calculated amount of information transfer.

10. The push-type information transmission device according to claim 9, wherein the push transmission unit determines priority based on information indicating a priority regarding order of transmission of the push transmission information to the transmission destination clients or a past transmission performance, and the push transmission unit transmits the push-type information based on the priority.

11. The push-type information transmission device according to claim 10, wherein the determination unit simulates the number of transmission destination clients using a combination of one of a plurality of kinds of the response delay distribution data and one of a plurality of kinds of the allowable band variation data.

12. The push-type information transmission device according to claim 9, wherein the determination unit simulates the number of transmission destination clients using a combination of one of a plurality of kinds of the response delay distribution data and one of a plurality of kinds of the allowable band variation data.

13. The push-type information transmission device according to claim 1, wherein the determination unit simulates the number of transmission destination clients using a combination of one of a plurality of kinds of the response delay distribution data and one of a plurality of kinds of the allowable band variation data.

14. A push-type information transmission method comprising:

determining a number of transmission destination clients of push transmission information in each of a plurality of chronologically continuous periods based on at least response delay distribution data that is a probability distribution indicating a ratio of responses to information in relation to time elapsed since transmission of the information and allowable band data that indicates allowable amount of information transfer, and transmitting a push-type information based on the determined number of clients, wherein the response delay distribution data is a probability distribution indicating a response ratio of clients in relation to time elapsed since transmission of push transmission information that induces responses from the clients as transmission targets to the clients, and the allowable band data indicates variation in the amount of information transfer per unit time that is allowable in relation to time elapsed of a communication network that is connected to the push-type information transmission device.

15. A non-transitory computer readable medium storing a program that causes a computer to perform a push-type information transmission method, the method comprising:

determining a number of transmission destination clients of push transmission information in each of a plurality of chronologically continuous periods based on at least response delay distribution data that is a probability distribution indicating a ratio of responses to information in relation to time elapsed since transmission of the information and allowable band data that indicates allowable amount of information transfer, and transmitting a push-type information based on the determined number of clients, wherein the response delay distribution data is a probability distribution indicating a response ratio of clients in relation to time elapsed since transmission of push transmission information that induces responses from the clients as transmission targets to the clients, and the allowable band data indicates variation in the amount of information transfer per unit time that is allowable in relation to time elapsed of a communication network that is connected to the push-type information transmission device.

* * * * *